(12) United States Patent
Sapkota et al.

(10) Patent No.: US 9,161,185 B2
(45) Date of Patent: *Oct. 13, 2015

(54) COMPUTER READABLE MEDIUM AND SYSTEM FOR VOICEMAIL SERVICE MOBILITY

(71) Applicant: SHORETEL, INC., Sunnyvale, CA (US)

(72) Inventors: Bhawani Sapkota, Fremont, CA (US); Timothy S. Olson, San Jose, CA (US)

(73) Assignee: SHORETEL, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/968,702

(22) Filed: Aug. 16, 2013

(65) Prior Publication Data

US 2013/0337780 A1    Dec. 19, 2013

Related U.S. Application Data

(63) Continuation of application No. 12/195,765, filed on Aug. 21, 2008, now Pat. No. 8,521,137.

(51) Int. Cl.
*H04M 11/10* (2006.01)
*H04W 4/12* (2009.01)
*H04M 3/533* (2006.01)
*H04M 3/42* (2006.01)

(52) U.S. Cl.
CPC ............ *H04W 4/12* (2013.01); *H04M 3/53308* (2013.01); *H04M 3/4234* (2013.01); *H04M 2207/206* (2013.01)

(58) Field of Classification Search
CPC ....... H04W 36/14; H04W 88/06; H04W 4/16; H04W 36/18; H04W 84/16; H04W 84/12; H04W 36/0055; H04W 36/36; H04W 8/12; H04W 36/00; H04W 36/0011; H04W 36/12; H04W 36/24; H04W 36/28; H04W 36/385
See application file for complete search history.

(56) References Cited

U.S. PATENT DOCUMENTS

| | | | |
|---|---|---|---|
| 4,468,529 | A | 8/1984 | Samuel et al. |
| 5,722,076 | A | 2/1998 | Sakabe et al. |
| 5,901,212 | A | 5/1999 | True et al. |
| 6,389,276 | B1 | 5/2002 | Brilla et al. |
| 7,305,079 | B1 | 12/2007 | Forte |
| 2002/0085701 | A1 | 7/2002 | Parsons et al. |
| 2003/0157923 | A1 | 8/2003 | Tani |
| 2005/0030941 | A1 | 2/2005 | Lee et al. |
| 2006/0111058 | A1* | 5/2006 | Grant et al. ................. 455/127.1 |
| 2007/0123238 | A1* | 5/2007 | Jagadeesan et al. .......... 455/415 |
| 2007/0259688 | A1 | 11/2007 | Forte |
| 2010/0009674 | A1* | 1/2010 | Sapkota et al. ............ 455/426.1 |

FOREIGN PATENT DOCUMENTS

| | | | |
|---|---|---|---|
| WO | WO 01/41414 | A1 | 6/2001 |
| WO | WO 2004/047415 | A1 | 6/2004 |
| WO | WO 2008/051778 | A2 | 5/2008 |

* cited by examiner

*Primary Examiner* — Nimesh Patel
(74) *Attorney, Agent, or Firm* — Tarolli, Sundheim, Covell & Tummino LLP (57) ABSTRACT

A non-transitory computer readable medium can include instructions for performing a method. The method can include receiving, at a mobile client, an enterprise call from an enterprise system in response to an incoming call from a calling party to the enterprise system. The method can also include determining, at the mobile client, whether the enterprise call is anchored in the enterprise system. If the enterprise call is determined to be anchored in the enterprise system, a confirmation message can be provided from the mobile client to the enterprise system in response to the enterprise call being answered for voice communication at the mobile client.

29 Claims, 3 Drawing Sheets

FIG. 3

COMPUTER READABLE MEDIUM AND SYSTEM FOR VOICEMAIL SERVICE MOBILITY

CROSS-REFERENCE TO RELATED APPLICATION

This application is a continuation of U.S. patent application Ser. No. 12/195,765 (now U.S. Pat. No. 8,521,137), filed Aug. 21, 2008, and entitled SYSTEM AND METHOD FOR VOICEMAIL SERVICE MOBILITY, the entire contents of which is incorporated herein by reference. Any disclaimer that may have occurred during the prosecution of the above-referenced application(s) is hereby expressly rescinded, and reconsideration of all relevant art is respectfully requested.

TECHNICAL FIELD

This disclosure relates generally to communications and, more particularly, to a computer readable medium and method for voicemail service mobility.

BACKGROUND

Fixed and mobile convergence (FMC) solutions are being developed to enable substantially seamless interoperability of different communication technologies and platforms. To this end many wireless devices are being manufactured to support services using more than one type of wireless communication technology. For example, portable electronic devices, such as cellular telephones, laptop computers and personal digital assistants, can include interfaces that support both wide-area access (e.g., using cellular technologies) as well as more local-area access (e.g., using wireless local area network (WLAN) technologies, and/or Bluetooth technologies) to name a few.

As a further example, many enterprise networks support voice over internet protocol (VoIP) that can run over one or more wireless networks. For instance, WiFi voice networks currently support VoIP and, with little integration, with a wider area voice network, such as cellular networks. The integration of such networks and technologies provides for service mobility in which a user can access substantially the same set of services regardless of geographical locations or method of communication.

SUMMARY

The disclosure relates to voicemail service mobility.

In one example, non-transitory computer readable medium can include instructions for performing a method. The method can include receiving, at a mobile client, an enterprise call from an enterprise system in response to an incoming call from a calling party to the enterprise system. The method can also include determining, at the mobile client, whether the enterprise call is anchored in the enterprise system. If the enterprise call is determined to be anchored in the enterprise system, a confirmation message can be provided from the mobile client to the enterprise system in response to the enterprise call being answered for voice communication at the mobile client.

In another example, a non-transitory computer-readable medium can include instructions for performing a method. The method can include placing an enterprise call from an enterprise system to a mobile client in response to receiving a third party call from a calling party to an enterprise telephone number that is associated with the mobile client, the third party call defining a first call leg and the enterprise call defining a second call leg. The method can also include connecting the first call leg with the second call leg to provide a media connection between the calling party and the mobile client in response to receiving a confirmation message from the mobile client before a confirmation timer reaches a predetermined answer time to indicate an end user has answered the enterprise call at the mobile client. The method can also include connecting the first call leg to a designated enterprise voicemail box in response to determining that the end user has not answered the enterprise call at the mobile client.

In yet another example, a system can include call anchoring control programmed to control anchoring an incoming call in an enterprise system, the incoming call being from a calling party to an enterprise number associated with an end user, the call anchoring control further configured to initiate an enterprise call to a mobile client associated with the end user. A confirmation processor can be programmed to receive a confirmation message provided automatically from the mobile client to indicate that the enterprise call has been answered for voice communications at the mobile client, the confirmation processor being configured to determine whether the enterprise call has been answered for voice communications at the mobile client. The call anchoring control can be further configured to connect the incoming call to an enterprise voicemail box associated with the mobile client in response to determining that the user did not answer the incoming call at the mobile client and to connect the incoming call with the enterprise call in response to determining that the enterprise call has been answered for voice communications at the mobile client.

DETAILED DESCRIPTION

The present invention relates to a system and method for providing a common voicemail box for a fixed-mobile convergence device. The approach described herein helps to achieve fixed-mobile convergence by cooperation between one or more mobile client and applications running in an enterprise system having access to a voicemail system. For instance, the mobile client is programmed to provide a confirmation message to the enterprise system if an end user answers an incoming call that has been anchored in the enterprise. The "end user" in this context refers to an actual person that answer's the call, regardless of the manner in which such end user answers the call. This is to be contrasted with cellular voicemail or other means that may also answer the call. Call control at the enterprise network is programmed to use the confirmation message to control whether to connect the call with an enterprise voicemail system or to connect the call with a calling party that placed a call to an enterprise number that is associated with the mobile client. For instance, the enterprise call control can connect the incoming call from the calling party with the mobile client if the confirmation message is received to indicate that an end user has answered the enterprise call at the mobile client. Alternatively, the enterprise call control can connect the incoming call to a designated voicemail box for the mobile client (e.g., an enterprise voicemail box) if it is determined that the call has not been answered by a user at the mobile client (e.g., the call is ignored or sent to cellular voicemail). The associated enterprise call control also disconnects the outgoing call to the mobile client in response to determining that the end user has not answered the call so that such enterprise call does not end up in cellular voicemail.

As will be appreciated by those skilled in the art, portions of the invention, including portions implemented in the mobile client or in the enterprise, may be embodied as a method, data processing system, or computer program product. Accordingly, these portions of the invention may take the form of an entirely hardware embodiment, an entirely software embodiment, or an embodiment combining software and hardware. Furthermore, portions of the invention may be embodied as a computer program product on one or more computer-usable storage medium having computer readable program code on the medium (or media). Any suitable computer-readable medium may be utilized including, but not limited to, static and dynamic storage devices, hard disks, optical storage devices, and magnetic storage devices, which may reside at one location or be distributed among storage devices.

Certain embodiments of the invention are described herein with reference to signaling diagrams and functional block diagrams of methods, systems, and computer program products. It will be understood that blocks of the illustrations, and combinations of blocks in the illustrations, can be implemented by computer-executable instructions. These computer-executable instructions may be provided to one or more processor of a special purpose computer, or other programmable data processing apparatus (or a combination of devices and circuits, such as in the form of a mobile client) to produce a machine, such that the instructions, which execute via the processor, implement the functions described with respect to the block or blocks.

These computer-executable instructions may also be stored in computer-readable memory that can direct a computer (or computers) or other programmable data processing apparatus (e.g., a mobile client) to function in a particular manner, such that the instructions stored in the computer-readable memory result in an article of manufacture including instructions which implement the function specified in the block or blocks. The computer program instructions may also be loaded onto one or more computer or other programmable data processing apparatus or appliance to cause a series of operational steps to be performed on the computer or other programmable apparatus or appliance to produce a computer implemented process such that the instructions which execute on the computer or other programmable apparatus provide steps for implementing the functions specified in the blocks depicted in the appended drawings.

In certain embodiments, the mobile client can be configured to operate in any number of one or more different radio technologies, any of which may be utilized to send or receive a voice call as well as communicate data. As used herein, the term "radio technology" and variations of this term are intended to encompass any form of wireless communication that may be utilized to send, to receive or to send and receive audio signals (including voice signals), data signals or a combination of voice and data signals without requiring a hardwired or other physical connection. Examples of different radio technologies include cellular telephones (e.g., 2G, 3G or 4G Global System for Mobile (GSM) technologies), Universal Mobile Telecommunications System (UMTS) technologies, or personal communication system (PCS) communication technologies; wireless networks (e.g., wireless local area networks (WLAN), such as WiFi; wireless metropolitan area networks (WirelessMAN), such as WiMAX; and any variation and improvements thereof), satellites, Bluetooth, two-way (or half-duplex) radio, and any combinations thereof. Those skilled in the art will understand and appreciate that various standards and protocols exist and have yet to be developed to enable communication of data and voice via these and other radio technologies. For example, the mobile client can be embodied in any form of device, such as including a cellular telephone, personal digital assistant (PDA), a portable computer (e.g., a laptop computer, or tablet computer) and the like.

Figure 1:
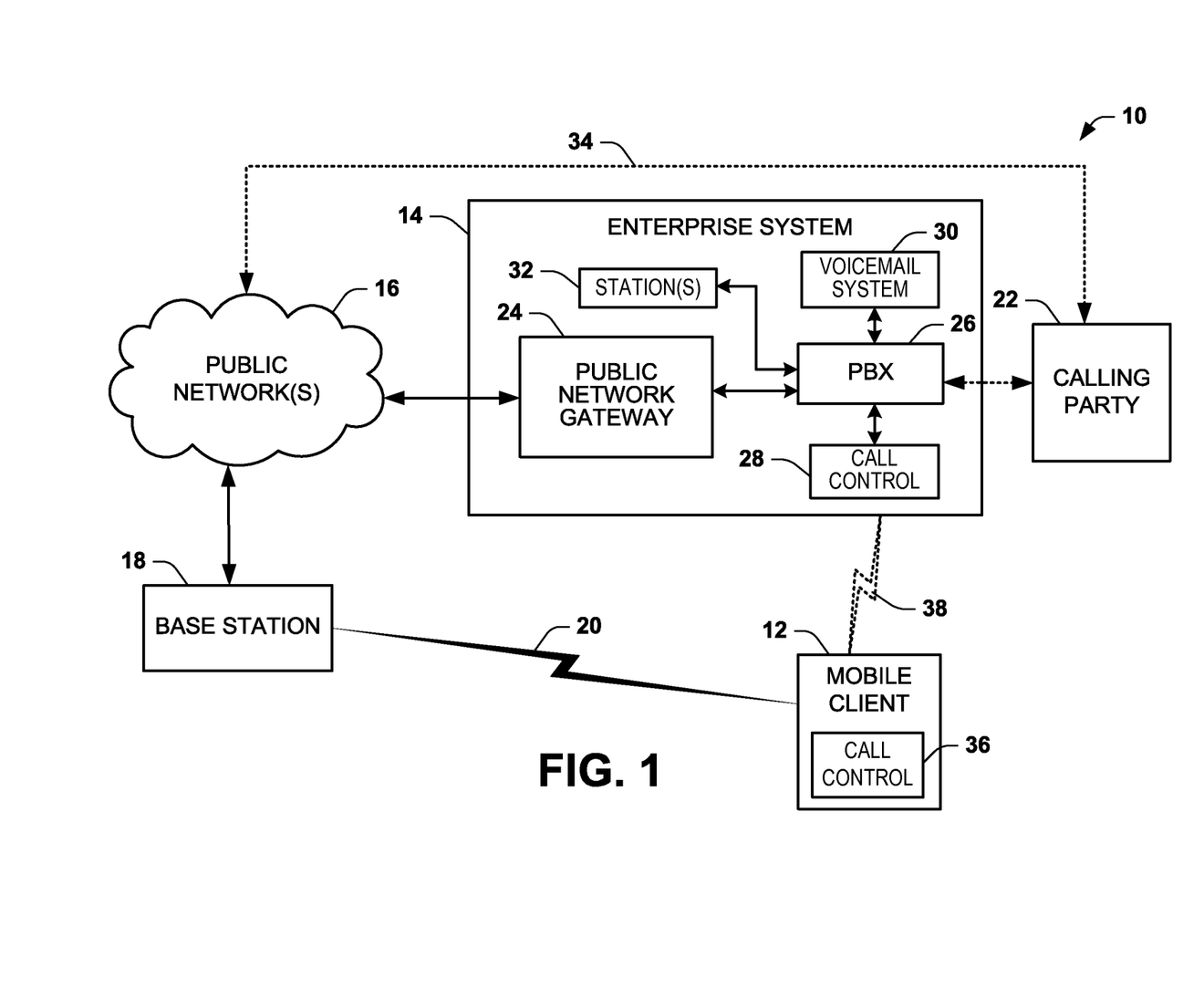
FIG. 1 depicts a block diagram of an example of a communication system that can provide voicemail mobility according to an aspect of the invention.

Turning to the figures, FIG. 1 depicts an example of a communication system 10 that can implement various aspects of the invention. The system includes a mobile client 12 and an enterprise system 14. The enterprise system 14 can communicate with the mobile client 12 via one more public network 16. Those skilled in the art will understand that the particular types of protocols utilized for communication between the mobile client and the system 14 may vary depending on the type and configuration of the mobile client and the wireless network (or networks) through which the mobile client can communicate.

The mobile client 12 can be implemented as a single or multimode device that includes a corresponding number of one or more wireless interfaces. The mobile client 12 is configured to communicate data and voice using one or more of the wireless interfaces. Each wireless interface employs a corresponding communication protocol for communication of voice, data and or voice and data via an associated radio technology. For example, the mobile client 12 can include a data interface and a voice interface that can be employed to send and receive data and voice, respectively, relative to the mobile client using a corresponding radio technology (e.g., a cellular radio technology, such as GSM or PCS). The particular manner in which an incoming voice call is connected to the mobile client from an associated base station will vary depending on the protocol established for network to which the mobile client is connected. It will be appreciated the protocol can permit concurrent communication of voice and data via a corresponding wireless interface of the mobile client. If the mobile client 12 is a multi-mode device, the mobile client can include one or more additional wireless interface that is can be configured to provide for communication of voice, data or a combination of voice and data via a radio technology that is different from the first wireless interface.

The mobile client 12 can include an associated public (or enterprise) telephone number. For instance, calls placed by a calling party 22 to the enterprise telephone number for the mobile client 12 can be routed by the public network 16 to the enterprise system 14 for selective routing to the mobile client, such as through a local wireless base station 18. Alternatively, the enterprise system 14 may send the incoming call placed to the enterprise telephone number to another communication device that is associated with the enterprise number. Such other communication device can include an analog telephone, a digital telephone, a laptop computer, a PC or other communications enabled device that is associated with the enterprise telephone number. Those skilled in the art will understand and appreciate that the enterprise number can be considered a "one" number that may be shared by or be common to a plurality of fixed and mobile devices, including the mobile client 12 and one or more other telecommunication devices such as analog or digital telephones connected within the enterprise system 14. It will be further understood and appreciated various types of criteria and algorithms that can be implemented by the enterprise network to determine where the call to the enterprise number should be routed. The approach described in the examples herein relates to situations when the call is routed to the mobile client such as by placing another call to the mobile client.

One or more private (e.g., cellular) telephone number is also associated with the mobile client 12. In contrast to calls placed to the enterprise number, a call that is placed to the private telephone number associated with the mobile client 12 is routed directly (e.g., corresponding to a direct call) to the mobile client through the base station 18. Thus, the enterprise system 14 can make a call to the private telephone number associated with the mobile client 12 as part of the process for transferring an incoming call to the enterprise number for the mobile client.

The enterprise system 14 can include a public network gateway 24 that provides an interface connection to public network 16. The interface connection can include, for example, as a primary rate interface (PRI)) or basic rate interface (BRI), which can vary depending on the level of service associated with the enterprise system 100. Other types of connections can also be utilized to interconnect the gateway 24 with the public network 16.

At the enterprise, the public network gateway 24 can be coupled to a PBX (Private Branch Exchange) 26 that includes hardware and software that is programmed and configured to route calls within the enterprise system 14. The PBX can implement any combination of private or hosted switching as well as any circuit switched or packet switched. The PBX 26 can also be implemented as an internet protocol (IP) PBX, such as to be capable of carrying voice over IP (VoIP). The PBX 26 can provide a variety of PBX functionality.

The PBX 26 can be connected to (or include) call control processing 28 to control routing and manage calls placed to telephone numbers associated with the enterprise system 14. For instance, the call control 28 is programmed to route the incoming call placed to the enterprise number to the mobile client 12, such as through the public network gateway 24, the public network 16, the local base station 18 and ultimately at the mobile client. In other situations and circumstances, the call control 28 is programmed to forward the incoming call to a voicemail system 30.

The voicemail system 30 can be implemented in a variety of different ways as is known in the art such as including a designated voicemail box programmed for use in storing voicemail messages and greetings for a given end user. There can be any number of one or more such voicemail boxes programmed in the voicemail system 30. In one embodiment, the voicemail system 30 includes a common voicemail box for the enterprise telephone number associated with the mobile client 12. Such common mailbox can be utilized to provide an appropriate greeting and store messages for calls placed to the enterprise number. The voicemail box can be accessible via the mobile client 12 as well as being accessible via one or more other devices or stations 32 which may operate within or external to the enterprise system 14. It is to be understood that such stations 32 can be hardwired in a network infrastructure to which the voicemail system 30 is coupled, or alternatively, one or more of such devices can be wirelessly in communication with the network and the voicemail system 30 or otherwise be capable of communicating with the enterprise system 14. It further thus should be understood and appreciated that the systems and methods described herein can be utilized effectively, without distinction, as to the type and configuration of the enterprise system 14 and PBX 26.

By way of further example, in the system 10, the calling party 22 can place a call to the enterprise number that is associated with the mobile client 12 via the public network 16. This call is indicated at dotted line 34 interconnecting the calling party 22 and the public network 16. It is to be understood that the calling party 22 can utilize any type of communication equipment capable of placing a telephone call irrespective of the location of the calling party relative to the mobile client 12 or to the enterprise system 14. The public network 16 in turn routes the call to the enterprise system 14 via the public network gateway 24. It will further be understood that, in certain embodiments, the incoming call can originate from one of the other stations 32 within the enterprise system 14 or another mobile client, such as by short digit dialing or extension dialing.

The public network gateway 24 signals the appropriate hardware and/or software associated with the PBX 26 to identify the incoming call. The call control 28, in response to recognizing that the incoming call needs to be forwarded to the mobile client 12, anchors the call in the enterprise network and places an outgoing call to a predetermined private (e.g., cellular) telephone number associated with the mobile client 12. As used herein, the term "anchor" and its phonetic variants refers to a point or to an operation within the enterprise system 14 operation where one or more call legs (e.g., an incoming call leg from a third party and the enterprise call leg) are connected in the enterprise system 14, such as connected to a port address in the gateway 24 or PBX 26. Additionally, in reference to the incoming call from the calling party 22 and the enterprise call that is placed to the mobile client 12 in response to the incoming call, each of the enterprise call leg and the incoming call leg would be considered anchored in the enterprise system 14.

As a further example, the call control 28 can include the database or registry of telephone numbers identifying the private cellular number associated with the mobile client 12 to which the outgoing call is to be placed. For instance, a corresponding enterprise telephone number associated with the mobile client can be used as an index for locating the private cellular number. The outgoing enterprise call to the mobile client can be sent to the public network gateway 24 and to the public network 16 to the appropriate base station 18 to which the mobile client is currently registered. At this stage there are two call legs at the enterprise system 14: an incoming call leg corresponding to the call from the calling party 22 and an outgoing enterprise call leg from the enterprise network to the mobile client.

The outgoing enterprise call can be routed through the public network 16 to the local base station 18, which provides coverage for the mobile client 12. It will be appreciated that the outgoing enterprise call leg is not required to go through the public network gateway 24, however. The enterprise call can be placed from the enterprise to the mobile client's private number using any type of wired or wireless technology (e.g., VoIP call, a cellular call or the like). In response to receiving the call placed by the enterprise system 14, the base station 18 can signal the mobile client 12 of an incoming call, which at this stage corresponds to the enterprise call leg placed from the enterprise system 14. The particular signaling method may vary depending on the protocol utilized by the base station 18. Thus at this stage the incoming call placed from the calling party 22 can be anchored in the enterprise network and/or the incoming call can simply ring at the enterprise network while the outgoing enterprise call is placed to the mobile client.

The mobile client 12 includes call control software 36 that is programmed to control processing of incoming calls received at the mobile client 12. Part of the call control method can include monitoring incoming call connection status to determine whether an end user of the mobile client has answered the incoming call. For example, the call placed from the enterprise system 14 to the mobile client 12 can ring at the mobile client in response to the signaling provided via the base station 18. A user thus has an option of ignoring the incoming call, answering the incoming call (e.g., by pressing the talk button), or otherwise answering the call or indicating the call is to be ignored by pressing a button or man machine interface. Alternatively, in certain situations, the mobile client may be powered down, such that the incoming call is not detected by the call control software 36. Since several options exist at the mobile client 12, the call control 36 is programmed to determine whether the action or inaction at the mobile client corresponds to the end user answering the call. In response to detecting that the end user has answered the call (e.g., by pressing the talk button or otherwise answering the call), the mobile client call control 36 automatically provides one or more confirmation message back to the enterprise system 14 or, in particular, to the enterprise call control 28 that is processing the incoming call leg from the calling party 22. It is to be understood that the call control method 36 at the mobile client 10 typically will only operate if the mobile client is turned on. Even when the client 12 is turned off, the enterprise system 14 is programmed to control routing the incoming call to the voicemail box in the absence of receiving the confirmation message from the mobile client.

As used in the context of providing the confirmation message, the term "automatically" means that the mobile client 12 is programmed to send the confirmation message in an automatic manner, programmatically without requiring any user intervention. The confirmation message generally will be sent without any knowledge of the user (unless the user is aware of such background functionality). The confirmation message provided by the mobile client is separate from any signaling between the base station 18 and the mobile client that is used to set up and connect the enterprise call there between. That is, the user answering the call operates as a trigger or stimulus that causes the mobile client to send the confirmation message, but the confirmation message is sent automatically regardless of how the user answers the call (e.g., be it answered by pressing a button, opening a phone, unlocking a key pad interface, being automatically answered after a predetermined number of rings or the like). Stated differently, the confirmation message is not sent manually by the user of the mobile client, but instead it is sent programmatically by the mobile client call control 36.

The information contained in the confirmation message and the manner in which the confirmation message is sent can vary according to the method in which the mobile client 12 provides the confirmation message. In one embodiment, the call control 36 at the mobile client 12 can provide the confirmation message as data provided to the enterprise system 14 via a data channel. For instance, the call control 36 can cause predefined confirmation data to be sent through a data interface of the mobile client 12 using a corresponding radio technology, which may be the same or different from the radio technology being used for the incoming call via the wireless communication link 20. That is, the confirmation message can be provided via a data channel using a first radio technology (e.g., cellular) via an out-of-band data channel of the communication link 20, which is sent through the base station 18 and public network 16. Alternatively, the confirmation message can be provided as data using a second radio technology that is different from cellular via a separate wireless communication link, indicated schematically at 38.

In another embodiment, the call control 36 can cause the mobile client 12 to provide the confirmation message to the enterprise system 14 via a voice channel that is connected through the base station 18 and public network 16 back to the enterprise system 14. For example, the confirmation message can be provided as a sequence of one or more DTMF tones.

In view of the foregoing, those skilled in the art will appreciate that the confirmation message can correspond to any of a variety of types of predetermined information provided through one or more different communication channels to indicate that the incoming call has been answered by the end user of the mobile client 12.

Additionally, since the mobile client 12 may receive calls from the enterprise system 14 that have been placed to the enterprise number associated with the mobile client and the mobile client can receive calls placed directly to the private cellular number associated with the mobile client, the call control 36 can also be programmed to distinguish between these two different types of calls. That is, the mobile client can include means to enable the call control 36 to determine if the incoming call to the mobile client is coming through the enterprise network (or anchored). The call control 36 can be programmed to make a determination if a call to the mobile client has been placed from the enterprise system 14 in response to a third party call to the enterprise number for the mobile client.

For example, the enterprise call control 28 can insert anchor metadata (e.g., a predefined prefix appended to a calling party identifier such as Caller ID) before placing the call to indicate that the call corresponds to a call placed by the enterprise system 14 to the mobile client's enterprise telephone number. The mobile call control 36 can employ the anchor metadata to determine that incoming call from the enterprise has been anchored in the enterprise. Alternatively, a Dialed Number Identification Service (DNIS) or Automatic Number Identification (ANI) algorithm can be utilized by the mobile client 12 to determine a telephone number for the calling party, which can further determine whether the call has been placed from the enterprise network. The call control 36 thus can be programmed to send confirmation messages in response to determining that the incoming call received at the mobile client 12 corresponds to a call coming through the enterprise network.

In situations when an out-of-band data network is available, information sent over the data network can be used by the mobile client 12 to determine if an incoming call is anchored in the enterprise network. For example, the enterprise system 14 can send a data message (e.g., with anchor data) over a data channel to inform the mobile client 12 that the call is coming through the enterprise system 14, which can be provided concurrently with placing the call. As yet another alternative, in response to an incoming call ringing at the mobile client 12, the mobile call control 36 can send a request to an application in enterprise network 14 via a data channel to query if the incoming call is an anchored call coming through the enterprise system. The enterprise call control 28 (or other method running in the enterprise system) can respond via the data channel (e.g., with anchor data) to enable the mobile client to take appropriate action.

When the mobile call control 36 determines that the incoming call from the base station 18 is a direct call to the private cellular number for the mobile client 12 or determines otherwise the call is not anchored in the enterprise system 14, the call control 36 can withhold and not send the confirmation message regardless of whether the end user has answered the call. This determination thus prevents potential confirmation from being automatically provided over the voice channel for direct calls that are not being processed or bridged through the enterprise system 14. It can also be used to control if a confirmation message is sent over data channel, such as to conserve bandwidth usage. The mobile call control 36 can also be programmed to control the timing and duration of the confirmation message that is provided from the mobile client 12 such as if the confirmation message is provided via a voice channel from the mobile client.

The enterprise call control 28 can control routing and connecting of the incoming call from the calling party 22 based on whether it is determined that an end user has answered the corresponding enterprise call to the mobile client. For example, the enterprise call control 28 can be programmed to connect the incoming call leg from the calling party 22 to the outgoing call leg placed to the mobile client 12 if the confirmation message indicates that the incoming call has been answered by an end user at the mobile client 12. Alternatively, the call control 28 can be programmed to route the incoming call from the calling party to a designated voicemail box for the voicemail box system 30 that is associated with the mobile client in response to determining that the end user has not answered the call at the mobile client. This determination can be made in the absence of receiving the expected confirmation message or if a message is received that indicates some event has occurred that is other than the end user answering the call. For example, the absence of the confirmation message or another type of message can inform the enterprise call control 28 that the call had been ignored, not answered, or had been answered by a voicemail service for the mobile client 12 (e.g., cellular voicemail) that is different from the enterprise voicemail system 30. That is, information received by the enterprise call control 28 can confirm that the call had been answered by the user of the mobile client 12 or the information can confirm that it has not been answered by the end user. In response to making this determination, the enterprise call control 28 can disconnect the outgoing call leg to ensure that such call does not end up, for example, in the cellular voicemail of the mobile client 12.

In the embodiment where the mobile client 12 provides the confirmation message to the enterprise system 14 through an active voice channel (e.g., a cellular voice channel), the enterprise call control 28 can be programmed to mitigate noise or disruption on the incoming call leg between the enterprise system 14 and the calling party 22. For example, the enterprise call control 28 can include a filter (e.g., a filtering process) that is programmed to extract the confirmation message or other information that may be provided as audible information on the voice channel to confirm that the end user has answered the call at the mobile client 12. For instance, the filtering can be programmed to extract DTMF tones during a time period when it is known that the confirmation might be provided.

Additional prearranged cooperation can exist between the mobile client call control 36 and the enterprise call control to facilitate filtering of the confirmation message from a voice channel at the enterprise call control 28. For example, the mobile client call control 36 can control timing when the confirmation message is provided. In one embodiment, the mobile client call control 36 can provide a first confirmation message via the voice channel and subsequently provide a second confirmation message a predetermined time period after the first confirmation message. The enterprise call control 28 can apply the known timing of the confirmation messages to identify and filter out the second and any subsequent confirmation messages if the first confirmation message is received.

Additionally, after the enterprise call control 28 determines that the confirmation message has been received, it can bridge the traffic to the calling party 22 for a predetermined period of time. During such bridging the enterprise call control 28 can continue to monitor the media from the mobile client 12 and filter out any reoccurrence of the confirmation message from the mobile client. The enterprise call control 28 can insert silence, or alternatively, it can provide white noise or any other predetermined sound to the calling party 22 in place of the confirmation messages that are filtered. After the expiration of this predetermined time period for confirmation message processing, the enterprise call control 28 can connect the call leg from the calling party 22 with the call leg between the enterprise network and the mobile client 12 directly, hence no filtering of any in-band DTMF digits.

In view of the foregoing, it will be appreciated that the system 10 programmed and configured as described herein facilitates the use of a single voicemail box for an end user of a mobile client for calls placed to the user's corresponding enterprise telephone number. Even though various types of signaling and protocols and different network infrastructures may reside within the public network 16 between the mobile client and the enterprise network, a protocol and network agnostic approach is provided that can effectively determine whether an end user has actually answered the call at the mobile client 12.

Figure 2:
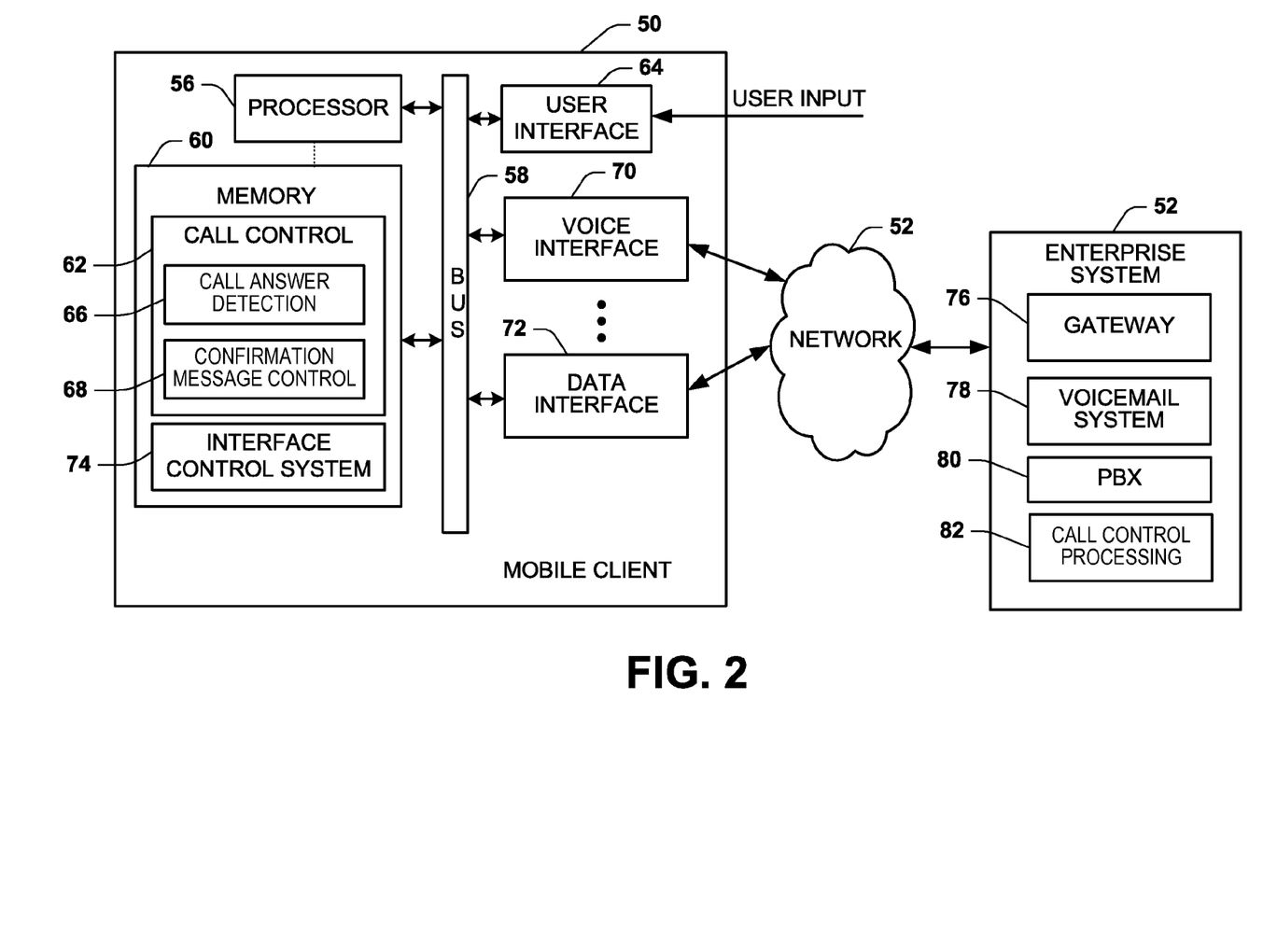
FIG. 2 depicts a block diagram of portions of a mobile client that can be implemented according to an aspect of the invention.

FIG. 2 depicts an example of a mobile client 50 that can be implemented according to an aspect of the invention. The mobile client 50 can provide for the transmission and receipt of voice, data, video and other information through bidirectional communication with one or more networks, schematically indicated at 52. It is to be understood that the mobile client 50 can communicate using any one or more of a plurality of radio technologies depending upon the requirements and capabilities of the mobile client 50. An enterprise system 54 is also connected to the network 52 via an appropriate (wired and/or wireless) connection. For instance, the network 52 can represent any combination of physical and wireless types of communication media, such as including cellular communications, public switch telephone network (PSTN), WiFi, WiMax or any one or more other combinations of wireless or wired communication technologies.

Generally, the mobile client 50 includes one or more processors 56 that are coupled to an internal bus 58 to provide for communication between the processor and other components operating within the mobile client. For instance, the mobile client 50 can include memory programmed with instructions executable by the processor 56 for controlling operation of the mobile client. In the example of FIG. 2, the blocks depicted in the memory 60 include instructions that are readable and/or executable by the processor 56 for performing methods or processes for controlling operation of the mobile client 50.

By way of example, the memory 60 includes a call control method 62 programmed for controlling calling functions associated with the mobile client, including functionality relating to processing of an incoming call. Such calling functions can include detecting an incoming call and providing a corresponding confirmation message in response to making a determination that the incoming call has been answered by an end user of the mobile client 50. For example, the mobile client 50 includes a user interface, which can be responsive to user interaction with one or more buttons, a touch screen, one or more switches or the like that can be utilized to answer an incoming call received at the mobile client. As one example, in response to ringing the phone to indicate an incoming call, the end user can press a "talk" or other button to answer the incoming call. The call control method 62 can include a call answer detection method 66 that is programmed to detect if the end user has answered the incoming call. As another example, a user input for answering an incoming call can be provided from a Bluetooth or other remote device in communication with the mobile client. The answer detection method 66 thus can determine that incoming call has been answered in response to the user interface 64 receiving a user input corresponding to the call being answered by an end user. The act of answering may occur locally or remotely relative to the mobile client 50 to provide for voice communication between the end user and enterprise system.

The call control 62 can also process information (e.g., anchor data) that is provided with the incoming call to determine if the incoming call has been sent through the enterprise system 54 (e.g., corresponding to an anchored call). The call control 62 thus can extract data from the incoming call or otherwise examine the origin of the call. The process of identifying that an incoming call has been anchored (e.g., extraction of metadata or other mechanism) can be transparent to the end user at the mobile client 50. For example, the client call control 62 can perform pre-processing and remove the anchor data from the incoming call data so that remaining processing of the incoming call can proceed in a normal manner (e.g., the caller ID is correct). The incoming call processing can vary according to the signaling provided from the cellular local base station in the network 52 with which the mobile client is connected for cellular service. Additionally, or alternatively, the call control 62 can receive anchor data from the network via an out-of-band data channel.

The call control 62 also can include confirmation message control 68 that is programmed to control transmission of the confirmation message from the mobile client to the enterprise system 54 in response to detecting that the incoming call has been answered by the end user (based on status or other information from the call answer detection method 66). Transmission of the confirmation message can further be controlled in response to confirming that the incoming call corresponds to a call sent through the enterprise system (e.g., a call to the enterprise number associated with the mobile client 50). It is to be understood that the confirmation that the call has been placed from the enterprise system 52 may not be present in a more simplified version of the mobile client 50 that is implemented according to an aspect of the invention.

In response to determining that the end user has answered the enterprise call, the confirmation message control 68 causes the mobile client to send the confirmation message to the enterprise system 54 via an appropriate interface, such as via a voice interface 70, a data interface 72 or as a combination of the voice and data interfaces of the mobile client 50. It is to be understood and appreciated that there can be any number of one or more voice interfaces 70 as well as any number of one or more data interfaces 72 operating within the mobile client 50, which may depend on the number of modes and radio technologies for which the mobile client has been designed and configured to operate. The memory 60 can also include an interface control system 74 that is utilized to control an appropriate interface for transmitting the confirmation message back to the enterprise system 54.

As one example, the confirmation message control 68 can be configured and programmed to provide the confirmation message to the enterprise system 54 via the data interface 72. The confirmation message control 68 can be programmed to send a first type of confirmation message (e.g., a positive confirmation) if the call answered detection method 66 determines that the call has been answered by the end user. Similarly, if the call is ignored, not received, or otherwise not answered by the end user, the confirmation message control 68 can provide a second type of confirmation message (e.g., a negative confirmation message) via the data interface 72 to inform the enterprise network 54 accordingly. Use of the data interface 72 at the mobile client 50 generally depends on whether an out-of-band data channel is available for communication between the mobile client to the enterprise system 54, such as through the network 52. Thus, coverage can vary whether this capability will be functional for the mobile client 50. There also exists a potential complexity of synchronizing and timing of the call answer confirmation via the data interface 72 depending, for example, upon the available bandwidth and the ability of the data channel to operate concurrently with the voice channel from the mobile client.

In another embodiment, the mobile client 50 can be programmed to send the confirmation message to the enterprise system 54 via the voice interface 70. For example, the confirmation message control 68 can invoke the interface control system 74 to provide a predetermined dual tone multiple frequency (DTMF) sequence of one or more tone (e.g., a "#" tone or other tone or combination of plural tones) as the confirmation message. Those skilled in the art will understand and appreciate that any type of DTMF or other audio frequency message that is transmittable via the voice interface 70 and can be utilized as the confirmation message. The voice interface 70 can provide the confirmation message to the enterprise system 54 via the network 52 in response to the end user answering the incoming call.

Moreover, the mobile client 50 can select which type of interface 70 or 72 to utilize for providing the confirmation message in conjunction with receiving the incoming call or the interface for providing the confirmation message can be set in advance. For example, the interface can be selected based on the relative availability or quality of service for the voice interface 70 or the data interface 72. Still in other embodiments, a given one of the interfaces can be utilized for all confirmation messages. As described herein, the mobile client 50 may be a single or multimode device capable of communicating with the enterprise system 54 using one or more types of radio technology, any of which can be used for providing the confirmation message.

It will be appreciated that additional functionality can be implemented by the confirmation message control 68, such as for embodiments that utilize the voice interface 70 for transmitting the confirmation message to the enterprise 54. For instance, it will be appreciated that various different types of networks and communication protocols exist that ultimately determine temporal availability of an active voice channel from the mobile client 50 to the network 52 for sending a confirmation message. As one example, one type of network configuration provides a fully established end-to-end call connection when the mobile client 50 receives a connected call event, such that the mobile client can transmit the confirmation message as soon as it accepts the call. In other network configurations, the call may not be established sufficiently initially in response the end user answering the call, such that an initial confirmation message transmitted through the voice interface 70 might be lost or otherwise not sent through the network 52. Accordingly, the confirmation message control 68 may be programmed to transmit the confirmation message any number of one or more times to provide an implementation that is effective for the various different types of network configurations. The number of transmissions can vary dynamically depending on the type of wireless protocol being implemented or it can be a fixed number of transmissions for all type of protocols.

As a further example, the confirmation message control 68 can cause the mobile client to transmit a first confirmation message a predetermined time after the call has been answered and a call connected event has been received from the network 52. The confirmation message control 68 further can transmit one or more subsequent confirmation messages at a predetermined time period thereafter. For example, the first confirmation message can be sent 500 milliseconds after the mobile client 50 receives the call connected event from the network 52, and approximately two seconds after transmitting the first confirmation message the mobile client 50 can transmit a second confirmation message.

The enterprise system 54 is programmed to connect the incoming call leg to an appropriate destination (e.g., to the mobile client call leg or to a voicemail box in a voicemail system 78) responsive to receiving (or to not receiving) the confirmation message. In the example of FIG. 2, the enterprise system 54 includes a gateway 76 for interconnecting the enterprise system 54 with the arrangement of one or more public and/or private networks, which can correspond to at least a portion of the network 52. The enterprise system 54 can also include a PBX (e.g., an IP-PBX) that is programmed and configured for routing calls received from the network via the gateway 76 to one or more stations (not shown), which may reside physically in the enterprise system 54 or reside external to the enterprise, such as described herein. The enterprise system 54 also includes call control processing 82 that is programmed to connect the incoming call leg from a calling party with the enterprise call leg to the mobile client 50 in response to the confirmation message indicating that the mobile client's end user has answered the call at the mobile client 50. Alternatively, if the call control/processing method determines that the end user at the mobile client 50 has not answered the call, the call control/processing block 82 can forward the incoming call leg the enterprise voicemail system 78.

Figure 3:
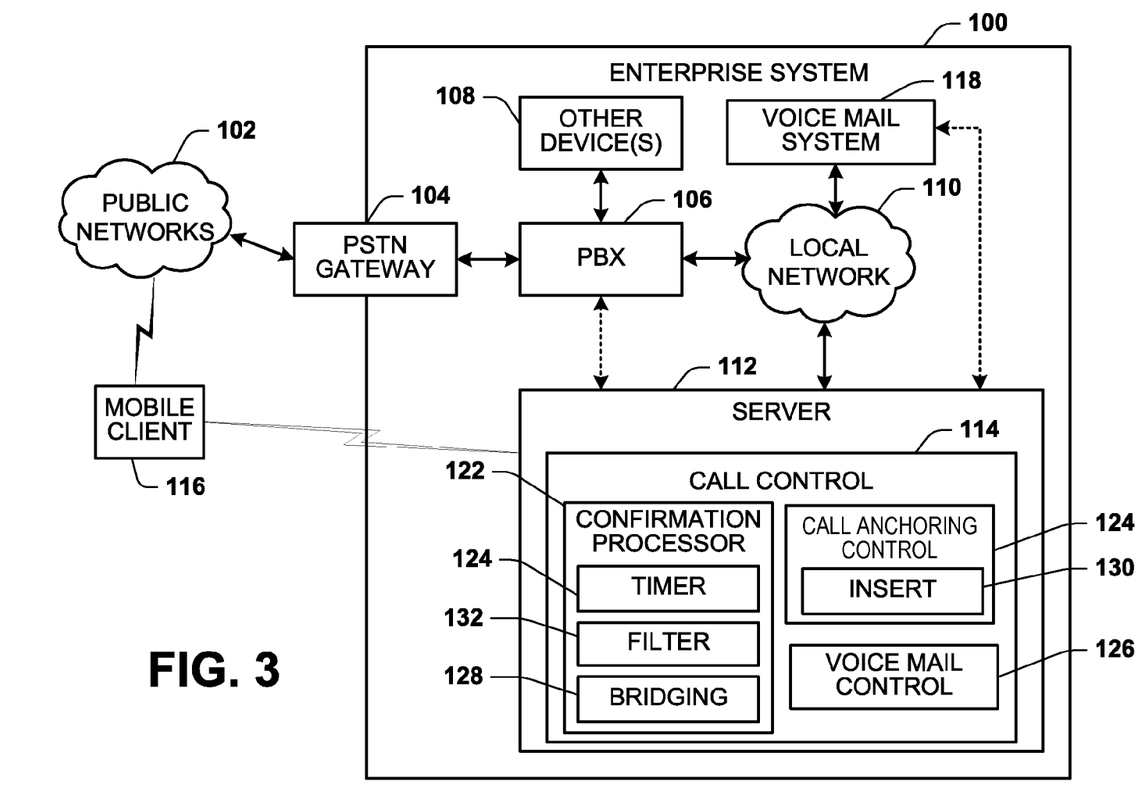
FIG. 3 depicts a block diagram of portions of an enterprise system that can be implemented according to an aspect of the invention

FIG. 3 depicts an example of an enterprise system 100 that can be utilized to enable use of a single voicemail box for multiple devices according to an aspect of the invention. The enterprise system 100 can be coupled to one or more public networks 102 via a corresponding public gateway 104. The public gateway 104 can reside wholly or partially within the enterprise system 100, as depicted in FIG. 3, or it can be external to the enterprise system. The enterprise system 100 includes a PBX 106 that is coupled to the gateway 104 for routing incoming and outgoing calls relative to the enterprise system. Those skilled in the art will understand various types of PBXs that can be utilized in enterprise including private or hosted systems, which can employ packet and/or circuit switching for routing of incoming and outgoing calls via the gateway 104. One or more other devices 108 can be coupled to the PBX 106, such as including any number of analog or digital telephones, fax machines, or any other communication enabled device. The capabilities and type of PBX 106 and the types of devices 108 in communication with the PBX can vary, for example, according to the application requirements and cost constraints of the enterprise and the number of potential users. The PBX 106 can be connected to a network 110 in the enterprise system 100 which can be a local network, a wide area network (e.g., including the internet) or any combination thereof.

A call control method 114 is programmed to control processing of incoming calls, which are placed to an enterprise telephone number. The incoming call can be received at the enterprise system 100 via the gateway 104 and provided to the PBX 106. For instance, an incoming call can be placed to a user's enterprise telephone number that is associated with any of the other devices 108 or associated with a mobile client 116 to which the enterprise number has been associated. It is to be understood that the enterprise number can be the "one number" that is associated with multiple devices, including one or more of the other devices 108 and the mobile client 116. The call control method 114 in cooperation with the PBX 106 determines to which device the incoming call should be routed. For instance, the PBX 106 operates to route the incoming call designating the enterprise number to the mobile client 116 or to a corresponding one of the other devices 108. According to an aspect of the invention, the call control 114 further can detect whether a call sent to the mobile client 116 has been answered by an end user of the mobile client in response to a confirmation message received from the mobile client 116. As described herein, the confirmation can be sent from the mobile client 116 to the call control 114 via a voice channel or a data channel.

In a network implementation, as shown in FIG. 3, the enterprise system 100 can include one or more server 112 that can include applications associated with controlling operation of various telecommunications equipment at the enterprise system 100, including the call control method 114. The server 112 can be connected with the PBX 106 directly (represented as dotted line connected there between), or the server can be connected to the PBX through the network 110, with each of the server 112 and PBX 106 operating as nodes in the network. As another alternative, the call control 114 can correspond to methods executed internally within the PBX 106. In any implementation, the call control 114 is programmed to control processing and routing of incoming calls according to an aspect of the invention.

By way of example, the call control 114 anchors the incoming call leg from a third party (not shown) within the enterprise system 100. For calls placed to the enterprise number associated with the mobile client 116, the call control 114 makes a corresponding outgoing call to the mobile client 116, which call can be placed through the gateway 104. This outgoing call will be referred to as the enterprise call leg. If the call control 114 determines that the end user at the mobile client 116 has answered the call in response to receiving a confirmation message sent from the mobile client, the call control can connect the incoming call leg with enterprise call leg placed from the enterprise system 100 to the mobile client 116. In situations when the call control 114 determines that the call has not been answered by the end user at the mobile client 116 (or if the call control 114 cannot confirm that the call has been answered), the call control 114 can transfer and connect the incoming call leg to an appropriate voicemail box in a voicemail system 118. The call control 114 can also cancel or otherwise cause the enterprise call to the mobile client to be disconnected concurrently with forwarding the incoming call leg to the voicemail system.

The voicemail system 118 can be connected to the server 112 via the enterprise network 110, as depicted in FIG. 3. Alternatively, the voicemail system 118 can be implemented within the PBX 106. While in the example of FIG. 3, the server and call control 114 and voicemail system 118 are illustrated as being connected to the PBX 106 via network 110 it is to be understood and appreciated that the PBX 106, voicemail system 118 and server or any combination of such components can be implemented and integrated together, such as within the PBX or in some other arrangement of dedicated telecommunications equipment.

As a further example, the call control 114 can include a call anchoring control 120 that is programmed to detect that an incoming a call is intended for an enterprise number associated with the mobile client 116. The control 120 can anchor the call leg from the calling party at the PBX 106, gateway 114 or elsewhere within the enterprise system 100 and initiate an outgoing enterprise call to a private (e.g., cellular) telephone number associated with the mobile client 116. The call can arrive at the mobile client 116 and be processed such as described herein. For example, when an end user at the mobile client 116 answers the incoming call from the enterprise (e.g., the enterprise call leg), the mobile client can be programmed to automatically provide a confirmation message back to the call control 114 at the enterprise system 100 to indicate that the call has been answered by the end user. As described herein, the confirmation message can be provided from the mobile client 116 via a voice channel or data channel or as a combination of voice and data.

Additionally, the call anchoring control 120 can also include an insert function 130 that is programmed to insert predetermined anchor data in one or more fields of the enterprise call that is being placed to the mobile client 116. The anchor data can be considered metadata since it corresponds to data that describes a characteristic of the calling data for the enterprise call that is placed to the mobile client; namely, the anchor data indicates that the enterprise call is anchored in the enterprise system 100. As one example, the insert function 130 can insert anchor data, such as a predetermined prefix or postfix, into the calling number field (e.g., part of the caller ID) of the call that is being placed to inform call control methods at the mobile client that the incoming call has been anchored within the enterprise system. For instance, the insert function 130 can append the calling number field before transferring the call to the public network 102 via the gateway 104 the call to the mobile client's private cellular number. Alternatively, the insert function 130 can set the entire calling number to a predefined anchor telephone number that is known to the mobile client 116 to indicate that call is anchored in the enterprise system 100.

As an alternative to utilization of the insert function 130 to modify data in the enterprise call being placed to the mobile client 116, the mobile client 116 can send an inquiry or request to the call control 114 via an out-of-band data service to determine if the call has been anchored. An appropriate data response from the call control 114 can be returned to the mobile client 116 to confirm whether the call has been anchored. As yet another alternative, the enterprise call control 114 can provide a separate out-of-bound data message to the mobile client 116 substantially concurrently with making the call to the mobile client to inform the mobile client that the call placed by the call control 114 is indeed anchored in the enterprise system 100. The mobile client 116 can provide the confirmation message when the end user answers a call that the mobile client has been determined to be anchored in the enterprise system 100.

At the enterprise system 100, the call control 114 also includes a confirmation processor 122 that is programmed to control the process associated with receiving the confirmation message and connecting the incoming call leg from the third party with either the enterprise call leg or the voicemail system 118. The confirmation processor 122 can include a timer 124 that is programmed to track timing of one or more events associated with confirming whether an end user has answered the enterprise call placed to the mobile client's private telephone number.

The timer 124 can include a confirmation timer function that is activated in response to detecting a call connected event for the enterprise call leg that had been placed to the private number associated with the mobile client 116. The confirmation timer function tracks the time duration from a call connected event (e.g., corresponding to time t=0) to a predetermined time that is utilized to determine if the confirmation message has been received within the predetermined confirmation time period. This confirmation time period may be programmable or it can be fixed.

Additionally, the timer 124 can include a connection timer function that is utilized to determine if the outgoing call has been connected with the mobile client 116 within another predetermined time period. The connection timer function is usually set for a greater time period than the confirmation timer function. Therefore, if the connection timer function of the timer 124 determines that the enterprise call placed to the private number of the mobile client 116 is not answered within a predetermined connection time, the call control 114 can employ voicemail control 126 to connect the incoming call leg with the voicemail system 118. Similarly, if the confirmation message is not received within the predetermined confirmation time from the call connecting event, the enterprise call control can employ the voicemail control 126 to connect the incoming call with the voicemail system 118.

When the confirmation message may be provided over a voice channel (e.g., as DTMF digits), the confirmation processor 122 can also include a bridging function 128 that is programmed to bridge media between the calling party and the mobile client 116 for an initial portion of the call. In particular, the confirmation processor 122 can employ the bridging function 128 to interface the incoming call leg between the enterprise and the calling party and the enterprise call leg between the enterprise system 100 and the mobile client 116. Such bridging function, for example, can operate by employing a gateway port address as part of the media session description information provided to set up the enterprise call. Since the enterprise call will be connected at such an identified port address in the enterprise system 100, incoming data packets can be monitored during the bridging period. The bridging function 128 can be active for a duration defined by the confirmation timer to control bridging between the respective call legs.

As a further example, the enterprise system 100 can also include a filter function 132 that filters out confirmation messages that are provided over the voice channel during the bridging time period. In the example of FIG. 3, the filter function 132 can be implemented as part of the confirmation processor 122 running within the application server 112. It will be appreciated that the filter function 128 can be implemented as hardware, software, or as combination of hardware and software that is configured to filter out the confirmation messages or other information that might be transmitted from the mobile client over a voice channel, such as during the bridging of call legs through the enterprise system 100. While depicted as being implemented within the confirmation processor 122, the filter 132 may reside or elsewhere in the enterprise system 100.

As a further example, DTMF can be used to provide the confirmation message from the mobile client 116 over a voice channel, such as by using a real-time transport protocol (RTP) to provide a voice media stream a specified port address in the enterprise system 100. For such an example, the filter 132 can be programmed to parse RTP buffers in the gateway 104 for the specified port address and extract the embedded DTMF as well as other potentially distracting data. The extracted data thus can be filtered out and dropped from the media stream between the calling party and the enterprise. The filter function 132, for instance, can operate to perform in-band analysis and extract tones according to RFC 2833 specification, which is published by the Internet Engineering Task Force.

By employing the filter function 132 to filter out the confirmation message provided via the voice channel, the confirmation message does not disrupt or disturb voice media that is provided to the calling party. During this bridging time period, the bridging function 128 can also insert white noise, a predetermined tone, silence or any other type of audio data (e.g., voice or music) in place of the confirmation message that is filtered out. After the expiration of the bridging period (e.g., as indicated by expiration of the confirmation timer), the call anchoring control 120 (or another part of the call control 114) can directly connect the incoming call leg with the enterprise call leg since there is no further need for the bridging function after the confirmation timer has expired. Additionally, the mobile client 116 can be programmed to not send the confirmation message in response to determining that the incoming is not anchored in the enterprise.

What have been described above are examples and embodiments of the invention. It is, of course, not possible to describe every conceivable combination of components or methodologies for purposes of describing the invention, but one of ordinary skill in the art will recognize that many further combinations and permutations of the present invention are possible. Accordingly, the invention is intended to embrace all such alterations, modifications and variations that fall within the scope of the appended claims. In the claims, unless otherwise indicated, the article "a" is to refer to "one or more than one."

What is claimed is:

1. A non-transitory computer readable medium that comprises instructions for performing a method, the method comprising:
   receiving, at a mobile client, an enterprise call from an enterprise system in response to an incoming call from a calling party to the enterprise system, wherein the enterprise call comprises identification data that identifies the calling party and anchor data that indicates that the call is anchored in the enterprise system;
   determining, at the mobile client, whether the enterprise call is anchored in the enterprise system based on the anchor data; and
   if the enterprise call is determined to be anchored in the enterprise system, providing a confirmation message from the mobile client to the enterprise system in response to the enterprise call being answered for voice communication at the mobile client.

2. The medium of claim 1, wherein the confirmation message is provided to the enterprise system through a data interface of the mobile client.

3. The medium of claim 2, wherein the data interface is configured to utilize a corresponding radio technology that is the same radio technology used for receiving the enterprise call at the mobile client.

4. The medium of claim 2, wherein the data interface is configured to utilize a corresponding radio technology that is different from a radio technology used for the receiving the enterprise call at the mobile client.

5. The medium of claim 1, wherein the confirmation message is provided to the enterprise system through a voice interface of the mobile client.

6. The medium of claim 5, wherein the method further comprises transmitting a first confirmation message a predetermined time after determining that the incoming call has been answered at the mobile client, and to transmit at least one second confirmation message at a predetermined time period thereafter transmitting the first confirmation message.

7. The medium of claim 1, wherein in the absence of determining that the enterprise call is anchored in the enterprise system, the mobile client refraining from providing the confirmation message.

8. The medium of claim 1, wherein providing the confirmation message comprises automatically providing the confirmation message from the mobile client to the enterprise system in response to the enterprise call from the enterprise system being answered at the mobile client separately from and subsequent to signaling between an associated base station and the mobile client for setting up and connecting the enterprise call.

9. The medium of claim 1, wherein the enterprise call to the mobile client is disconnected in response to determining that the enterprise call has not been answered at the mobile client call to prevent the enterprise call from going to a private voicemail box of the mobile client.

10. The medium of claim 1, wherein the anchor data is provided to the mobile client through a data interface of the mobile client.

11. A non-transitory computer-readable medium comprising instructions for performing a method, the method comprising:
    placing an enterprise call from an enterprise system to a mobile client in response to receiving a third party call from a calling party to an enterprise telephone number that is associated with the mobile client, the third party call defining a first call leg and the enterprise call defining a second call leg;
    providing anchor data to the mobile client indicating that the second call leg corresponds to a call that has been anchored in the enterprise system;
    connecting the first call leg with the second call leg to provide a media connection between the calling party and the mobile client in response to receiving a confirmation message from the mobile client before a confirmation timer reaches a predetermined answer time to indicate an end user has answered the enterprise call at the mobile client; and
    connecting the first call leg to a designated enterprise voicemail box in response to determining that the end user has not answered the enterprise call at the mobile client.

12. The medium of claim 11, wherein the confirmation timer is activated in response to a receiving call connect message from the mobile client, the method further comprising determining if an answering party is the end user of the mobile client based on whether the confirmation message is received before the confirmation timer reaches the predetermined answer time.

13. The medium of claim 12, wherein method further comprises:
    bridging the media connection between the calling party and the mobile client in response to detecting the confirmation message in a voice media stream from the mobile client, the media connection being bridged through the enterprise system from activation of the confirmation timer until the confirmation timer reaches the predetermined answer time, and
    connecting the first call leg with the second call leg after the confirmation timer reaches the predetermined answer time.

14. The medium of claim 13, wherein the method further comprises removing the confirmation message from the voice media stream while the media connection is bridged through the enterprise system.

15. The medium claim 11, wherein providing anchor data to the mobile client further comprises inserting predetermined anchor data into at least one predetermined field of the enterprise call that is being placed to the mobile client to indicate that the third party call has been anchored in the enterprise system.

16. The medium of claim 11, wherein the designated enterprise voicemail box comprises a hosted voice mailbox for the end user.

17. The medium of claim 11, wherein the designated enterprise voicemail box comprises a common voicemail box for a given enterprise telephone number assigned to the end user and that is shared by a plurality telecommunication devices, including the mobile client.

18. The medium of claim 11, wherein providing anchor data to the mobile client further comprising providing the anchor data to the mobile client through a data interface of the mobile client.

19. The medium of claim 11, further comprising providing identification data to the mobile client to identify the calling party.

20. A system comprising:
call anchoring control programmed to control anchoring an incoming call in an enterprise system, the incoming call being from a calling party to an enterprise number associated with an end user, the call anchoring control further configured to initiate an enterprise call to a mobile client associated with the end user, wherein the enterprise call comprises identification data that identifies the calling party and anchor data that indicates that the call is anchored in the enterprise system;
a confirmation processor programmed to receive a confirmation message provided automatically from the mobile client to indicate that the enterprise call has been answered for voice communications at the mobile client, the confirmation processor being configured to determine whether the enterprise call has been answered for voice communications at the mobile client;
the call anchoring control further to connect the incoming call to an enterprise voicemail box associated with the mobile client in response to determining that the user did not answer the incoming call at the mobile client and to connect the incoming call with the enterprise call in response to determining that the enterprise call has been answered for voice communications at the mobile client.

21. The system of claim 20, wherein a hosted private branch exchange provides the enterprise voicemail box associated with the mobile client.

22. The system of claim 20, wherein the enterprise voicemail box comprises a common voicemail box for a given enterprise telephone number assigned to the end user that is shared by a plurality telecommunication devices, including the mobile client.

23. The system of claim 20, wherein the call anchoring control further comprises insert function programmed to insert predetermined anchor data in the enterprise call to the mobile client.

24. The system of claim 23, wherein the confirmation processor further comprises a confirmation timer function to determine if the confirmation message has been received within a predetermined confirmation time.

25. The system of claim 24, wherein the confirmation processor further comprises a connection timer function to determine whether the enterprise call has not been answered by the mobile client within a predetermined connection time that is greater than the predetermined confirmation time, the incoming call being connected with the enterprise voicemail box associated with the mobile client if the connection timer function determines that the predetermined connection time has been exceeded.

26. The system of claim 24, wherein the confirmation processor further comprises a bridging function to bridge a connection between the calling party and the mobile client in response to detecting the confirmation message in a voice channel from the mobile client, the connection being bridged through the enterprise system until the confirmation timer function reaches the predetermined confirmation time.

27. The system of claim 26, wherein the confirmation processor further comprises a filter to remove the confirmation message from the voice channel while the media connection is being bridged through the enterprise system.

28. The system of claim 20, wherein the confirmation message is received from the mobile client via one of a voice channel or a data channel.

29. The system of claim 20, wherein the call anchoring control further configured provide the anchor data to the mobile client through a data interface of the mobile client.

* * * * *